(12) United States Patent
Holdsworth et al.

(10) Patent No.: US 11,760,039 B2
(45) Date of Patent: Sep. 19, 2023

(54) APPARATUS AND PROCESS FOR PRODUCING PULTRUDED FRP REBAR

(71) Applicant: Owens Corning Reinforcement Solutions, LLC, Toledo, OH (US)

(72) Inventors: Peter Granville Holdsworth, Gisborne (NZ); David Gordon Picken, Dubai (AE)

(73) Assignee: Owens Corning Reinforcement Solutions, LLC, Toledo, OH (US)

( * ) Notice: Subject to any disclaimer, the term of this patent is extended or adjusted under 35 U.S.C. 154(b) by 0 days.

(21) Appl. No.: 17/635,552

(22) PCT Filed: Aug. 13, 2020

(86) PCT No.: PCT/IB2020/057612
§ 371 (c)(1),
(2) Date: Feb. 15, 2022

(87) PCT Pub. No.: WO2021/033086
PCT Pub. Date: Feb. 25, 2021

(65) Prior Publication Data
US 2022/0297393 A1    Sep. 22, 2022

(30) Foreign Application Priority Data
Aug. 16, 2019 (NZ) ........................ 756344

(51) Int. Cl.
*B29C 70/32* (2006.01)
*B29C 70/52* (2006.01)
(Continued)

(52) U.S. Cl.
CPC ............ *B29C 70/32* (2013.01); *B29C 70/523* (2013.01); *B29C 70/545* (2013.01); *E04C 5/07* (2013.01);
(Continued)

(58) Field of Classification Search
CPC ..................................................... B29C 70/32
See application file for complete search history.

(56) References Cited

U.S. PATENT DOCUMENTS 8,333,857 B2 * 12/2012 Brandstrom ........... B29D 23/00
242/174
2016/0089820 A1    3/2016 Schinkinger

FOREIGN PATENT DOCUMENTS

CA        2731343 C      10/2011
JP        H03129040       6/1991
(Continued)

OTHER PUBLICATIONS

Australian Patent Office, International Search Report in PCT Application No. PCT/IB2020/057612, dated Sep. 22, 2020 (3 pgs.).
(Continued)

*Primary Examiner* — Jeffry H Aftergut
(74) *Attorney, Agent, or Firm* — Calfee, Halter & Griswold LLP

(57) ABSTRACT

Apparatus for producing bent multi-sided pultruded fibre reinforced plastic reinforcement bar for concrete (commonly known as FRP rebar) comprises multiple resin wetting stages to simultaneously resin impregnate multiple bundles of fibreglass rovings continuously drawn through the resin wetting stages, multiple spiral winding stages arranged to spiral wind warps around the multiple wet rovings, and multiple rotating multi-sided former frames for continuously winding thereon the multiple wet rovings and holding the multiple rovings while curing. A related method is also claimed.

15 Claims, 5 Drawing Sheets

(51) Int. Cl.
 *B29C 70/54* (2006.01)
 *E04C 5/07* (2006.01)
 *B29K 309/08* (2006.01)
 *B29L 31/06* (2006.01)
 *E04C 5/06* (2006.01)

(52) U.S. Cl.
 CPC ....... *B29K 2309/08* (2013.01); *B29L 2031/06* (2013.01); *E04C 5/0613* (2013.01)

(56) References Cited

FOREIGN PATENT DOCUMENTS

| JP | H06297591 | 10/1994 |
| WO | WO-2014/084755 A1 * | 6/2014 |
| WO | WO-2020/016668 A1 * | 1/2020 |

OTHER PUBLICATIONS

Australian Patent Office, Written Opinion of the International Searching Authority, dated Sep. 22, 2020 (5 pgs.).
Examination Report from SA Application No. 522431676 dated Nov. 29, 2022.
Examination Report from EA Application No. 202291867 dated Dec. 20, 2022.

* cited by examiner

APPARATUS AND PROCESS FOR PRODUCING PULTRUDED FRP REBAR

This application claims priority, under Section 371, and/or as a continuation under Section 120, to PCT Application No. PCT/IB2020/057612, filed Aug. 13, 2020, which claims priority to New Zealand 756344, filed Aug. 16, 2019.

FIELD OF INVENTION

The invention relates to an apparatus and process apparatus for producing bent multi-sided pultruded fibre reinforced plastic reinforcement bar for concrete (commonly known as FRP rebar).

BACKGROUND

Pultruded FRP rod is produced by drawing a bundle of fibreglass or other reinforcement rovings through a resin bath to wet the roving with resin, and subsequently heating the wet roving to cure the resin and form a solid product.

Reinforcing bar or rebar used as concrete reinforcing is typically formed from steel rod but may be formed from fibre reinforced bar or rod. Steel rebar may comprise straight lengths or may be bent to multi-sided shapes. Typically reinforcing in a square cross-section concrete beam for example, comprises multiple rebar lengths in the length of the beam, and three or four-sided bent steel rebar elements spaced in the length of the beam to tie the rebar lengths together. These are wire-tied to the rebar lengths to hold them in place before the beam is poured.

SUMMARY OF INVENTION

An object of the invention is to provide an improved or at least alternative apparatus and/or process apparatus for producing bent multi-sided pultruded composite rebar.

In broad terms in one aspect the invention comprises apparatus for producing bent multi-sided pultruded FRP rebar, which comprises:
  multiple resin wetting stages to simultaneously resin impregnate multiple bundles of fibre rovings continuously drawn through the resin wetting stages,
  multiple spiral winding stages each arranged to spiral wind warps around the multiple wet rovings, and
  a rotating multi-sided former frame or frames for continuously winding thereon the multiple wet rovings and holding the multiple rovings while curing.

In broad terms in another aspect the invention comprises a process for producing bent multi-sided pultruded FRP rebar, which comprises:
  continuously drawing multiple bundles of fibre rovings through at least one resin wetting stage to resin impregnate the rovings,
  spiral winding warps around the multiple wet rovings,
  continuously winding the multiple wet rovings simultaneously onto a rotating multi-sided former frame, and
  curing the resin in the multiple rovings while on the former frame(s) to form bent multi-sided pultruded FRP product.

In broad terms in another aspect the invention comprises a process for producing bent multi-sided pultruded FRP rebar, which comprises:
  continuously drawing multiple bundles of fibre rovings through adjacent resin wetting stages to resin impregnate the rovings,
  spiral winding warps around the multiple wet rovings,
  continuously winding the multiple wet rovings simultaneously onto a rotating multi-sided former frame, and
  curing the resin in the multiple rovings while on the former frame(s) to form bent multi-sided pultruded FRP product.

In some embodiments the process comprises cutting the bent multi-sided pultruded FRP bar on the or each former frame into multiple individual bent multi-sided pultruded FRP rebar end products.

In some embodiments the process comprises winding multiple wet rovings onto one or more rotating multi-sided former frame(s) while removing cured product(s) from one or more other former frame or frames.

In broad terms in a further aspect the invention comprises apparatus for producing bent multi-sided pultruded FRP rebar, which comprises multiple resin wetting stages to simultaneously resin pressure impregnate multiple bundles of fibre rovings continuously drawn through the resin wetting stages, and multiple spiral winding stages each arranged to spiral wind a warp around a wet roving exiting one of the resin wetting stages.

Definitions
  In this specification:
  "bar" or "bar product" includes pultruded FRP material having any of a circular, oval, square, rectangular, or other polygonal cross-section shape i.e. "bar" includes "rod", and "rebar" "or rebar product" have a similar meaning.
  "bent" is used to describe the shape of a non-straight multi-sided pultruded FRP rebar product, having at least one bend creating at least two lengths or sides, and which may have two or three bends between three or four or more sides, and does not refer to or require that the solid rebar product have been bent after manufacture.
  "multisided" means having two or more sides and includes circular or oval or part-circular or oval or similar.
  "comprising" means "consisting at least in part of" and when interpreting a statement in this specification and claims that includes "comprising", features other than that or those prefaced by the term may also be present. Related terms such as "comprise" and "comprises" are to be interpreted similarly.
  "FRP" means fibre reinforced plastic, most commonly comprising glass fibres, but which may comprise other fibre types such as, basalt, carbon, or aramid fibres for example.

BRIEF DESCRIPTION OF THE FIGURES

The invention is further described with reference to the accompanying figures, by way of example and without intending to be limiting. In the figures.

DETAILED DESCRIPTION OF EMBODIMENT(S)

Figure 1:
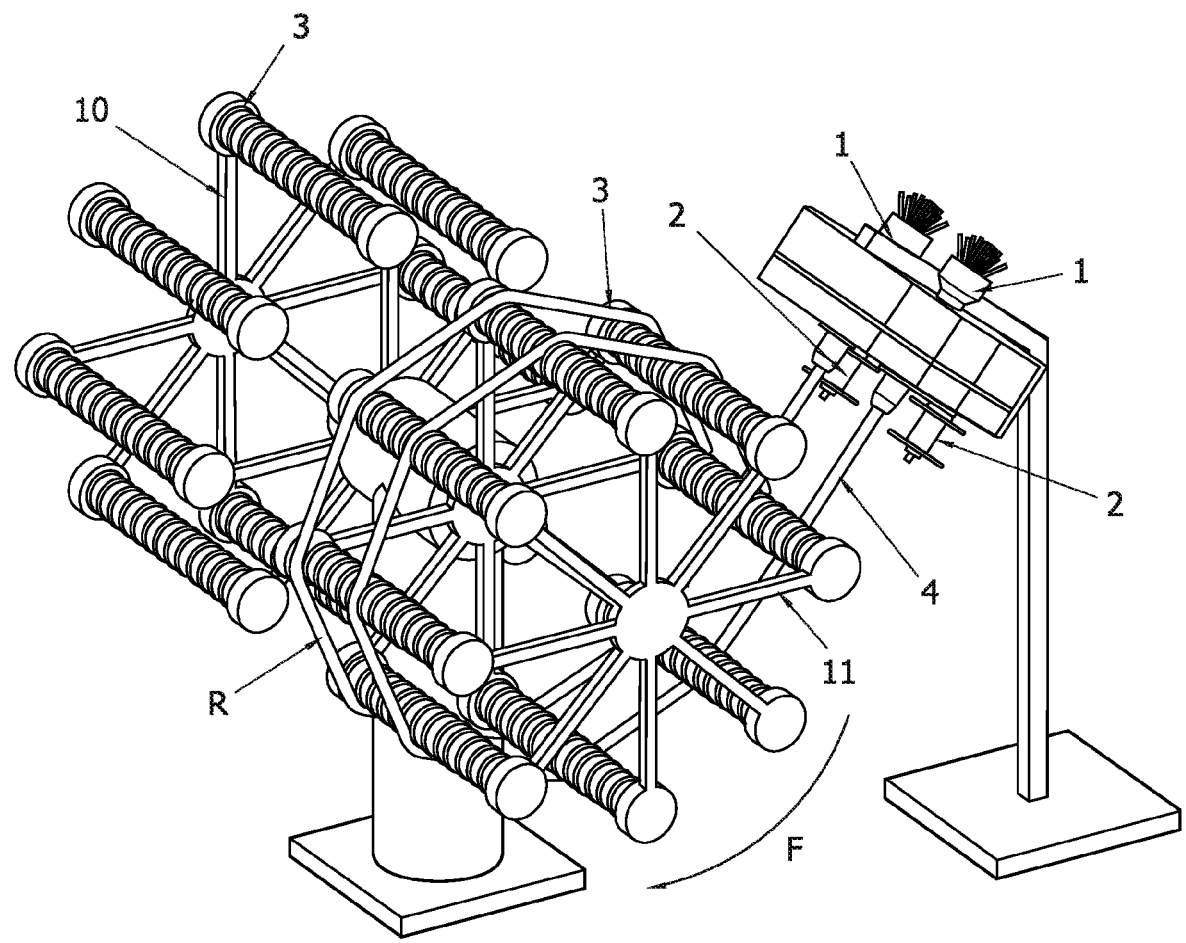
FIG. 1 is an overall view of an embodiment of apparatus or machine of the invention.
Figure 9:
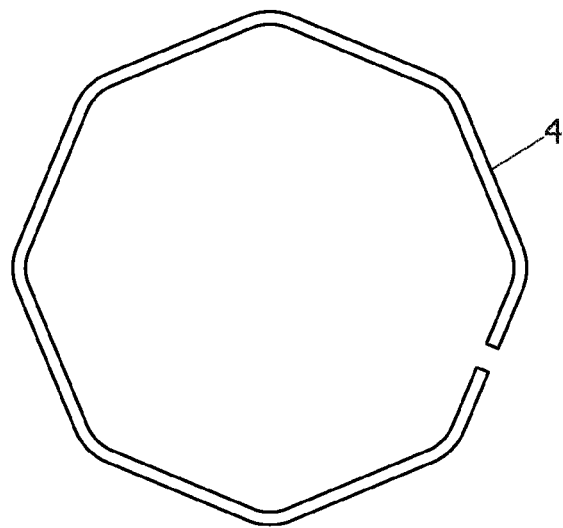
FIG. 9 shows an example of a bent multi-sided pultruded FRP rebar product produced by the machine.

Referring first to FIG. 1, the embodiment of apparatus or machine comprises multiple resin wetting stages 1, multiple spiral winding stages 2, and rotating multi-sided former frames 3 as will be further described. The machine simultaneously produces multiple bent multi-sided pultruded FRP rebar end products 4, suitable for use as reinforcing in place of conventional steel rebar product. An example of one individual rebar end product is shown in FIG. 9. The rebar product is intended for use in reinforcing a concrete beam, as one of multiple bent rebar elements spaced in the length of the beam that ties longitudinally extending rebar lengths together. The pultruded FRP rebar 4 shown is eight-sided with two ends 4a, but may have three or more sides, or two sides connected at one or both ends for example, or may be circular or oval or part-circular or oval or similar. The ends of the rebar may be simple cut ends or may comprise bent hook or other bent end shapes.

Figure 2:
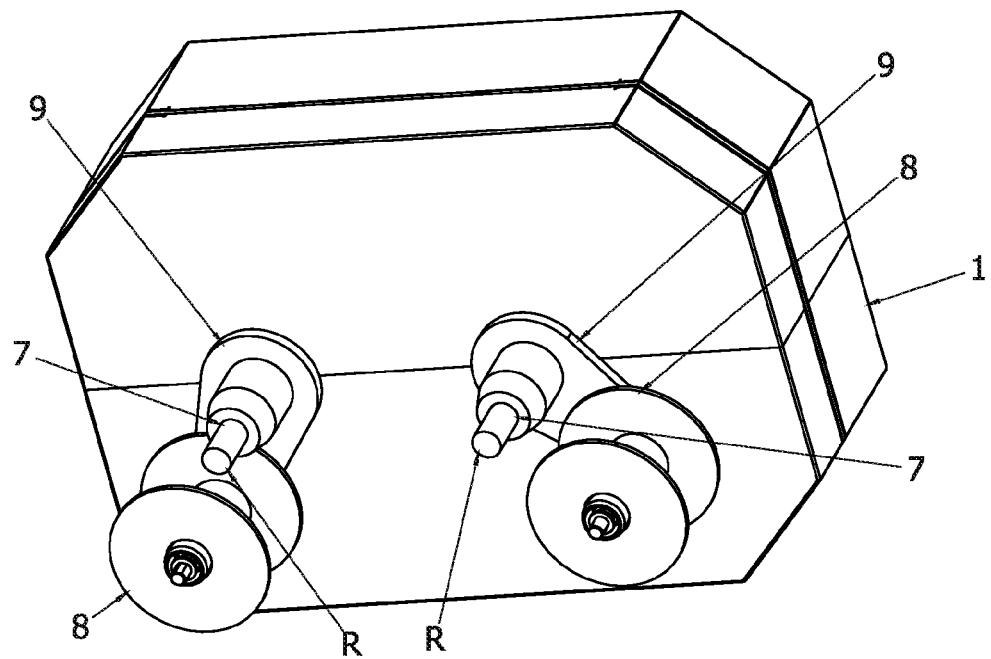
FIG. 2 is a perspective view of the underside of the resin wetting and spiral winding stages of the machine of FIG. 1.
Figure 3:
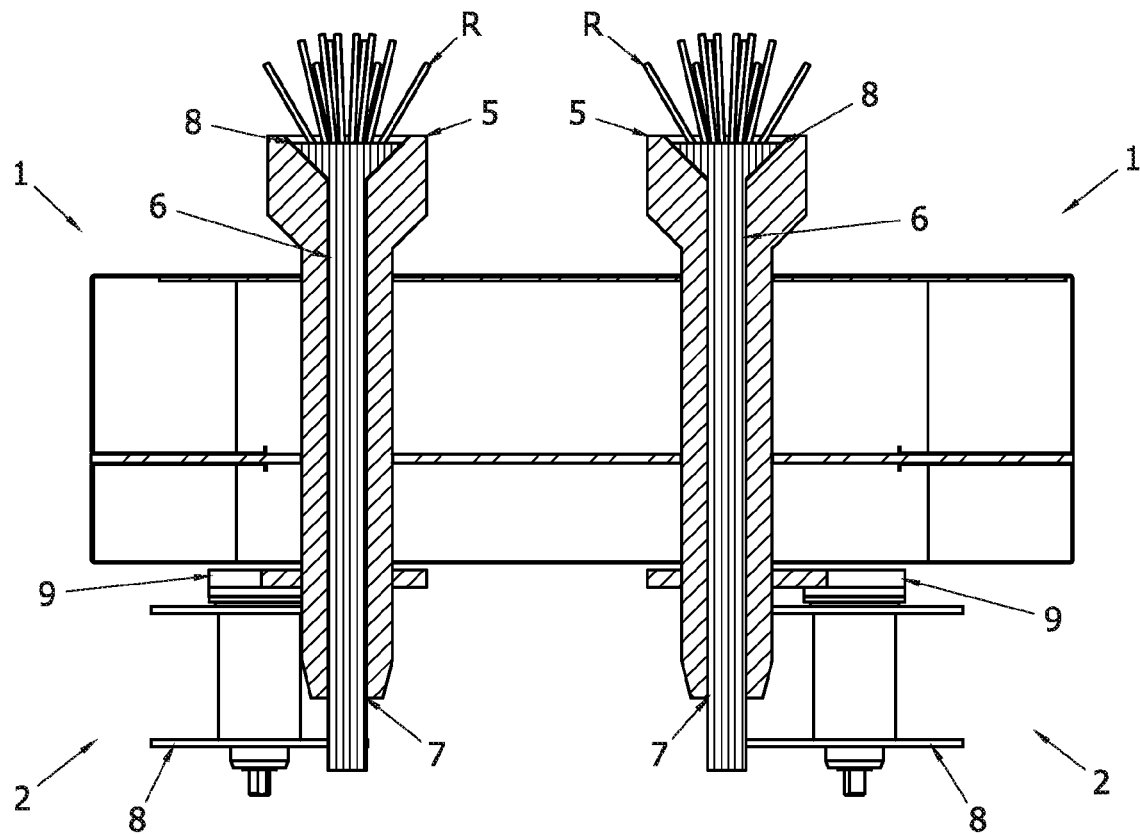
FIG. 3 is a cross-section view of the resin wetting and spiral winding stages.
Figure 4:
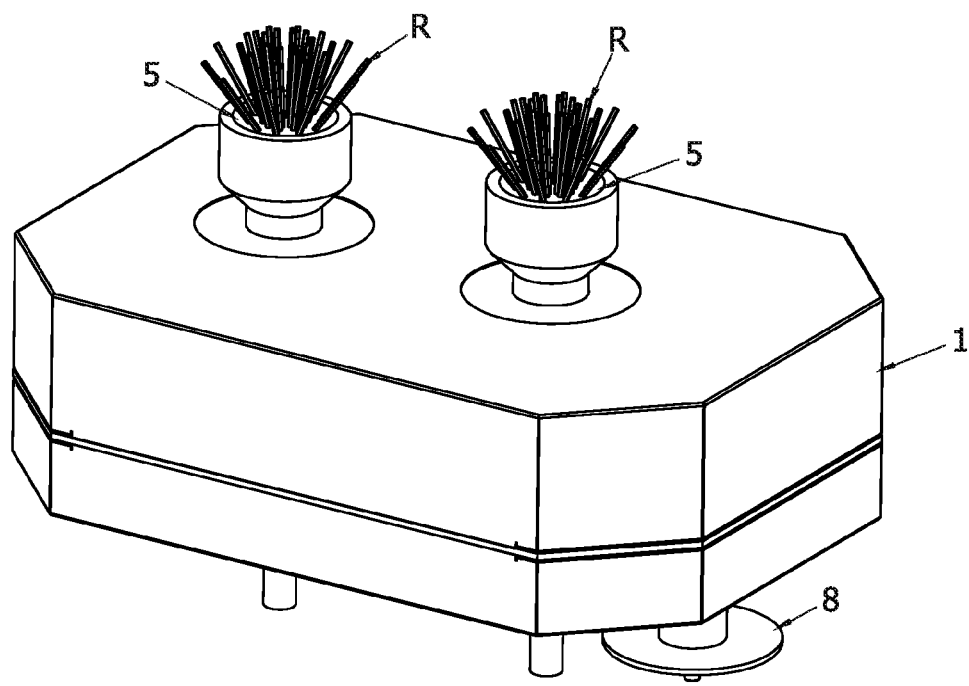
FIG. 4 is a perspective view of the top or entry end view of the resin wetting and spiral winding stages.
Figure 5:
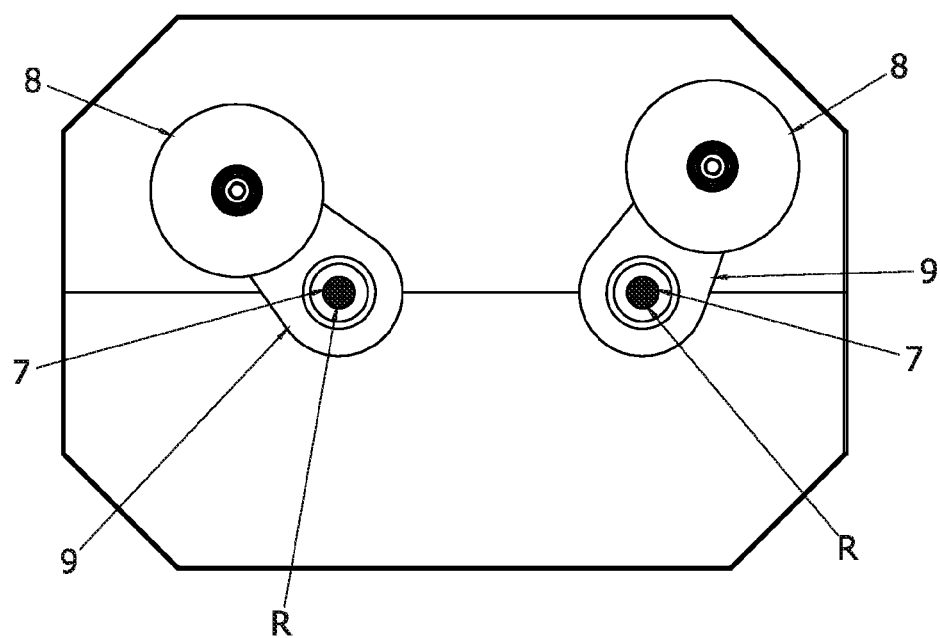
FIG. 5 is an underside or exit end view of the resin wetting and spiral winding stages.

FIGS. 2 to 5 show the resin wetting and spiral winding stages of the machine of FIG. 1. In operation the multiple resin wetting stages operate together to continuously and simultaneously resin impregnate multiple bundles of rovings of glass fibre or other suitable fibre such as basalt, carbon, or aramid fibres for example or a mixture thereof, continuously drawn through the machine. The spiral winding stages then operate to spiral wind a warp around each individual wet roving. For simplicity FIGS. 2 to 4 show two adjacent resin wetting winding stages. Each comprises an entry port 5 for a rovings bundle, into an internal cavity 6, and exit port 7. A resin entry port 8 supplies resin into the interior of each cavity 6. Optionally, resin may be supplied under pressure. In use rovings bundles R—see FIG. 3, move at a steady speed through entry ports 5 and exit from port 7. The rovings bundles are drawn through the machine by gripper wheels (not shown) after the spiral winding stages 2 in the machine direction, driven by an electric motor. As the rovings bundles move through the impregnation cavities 6 they are impregnated with resin, so that the rovings bundles are wet with resin when they exit ports 7. The resin and the machine speed are co-ordinated to ensure that the rovings bundles are impregnated with resin through their full cross-sections.

As the wet rovings R exit the impregnation stage a warp is spiral wound around each wet rovings bundle. Each warp may comprise a single strand or a small bundle of multiple strands, of the same material as the fibre rovings, or other suitable material such as Nylon or other synthetic material or cotton or other organic material for example. The spiral warp is wound at a spaced pitch, such that for example if the impregnated rovings bundle has a cross-section dimension in the range 1-3 cm for example, then the warp pitch may also be in the range 1-3 cm. The spiral warp is preferably wound at a tension to slightly compress the rovings bundles beneath the warp along the length of the warp where it contacts the rovings, relative to the rovings segments between warp spirals, which help create a non-smooth exterior surface on the finished solid rebar product and may give it a slightly varying diameter. Referring to FIGS. 2 to 5, a warp bobbin 8 supplies the warp to a rotating winder 9 around each exit port 7. The winders 9 operate simultaneously to spiral wind the warps around the wet rovings bundles as each exits the resin impregnation stage.

Figure 6:
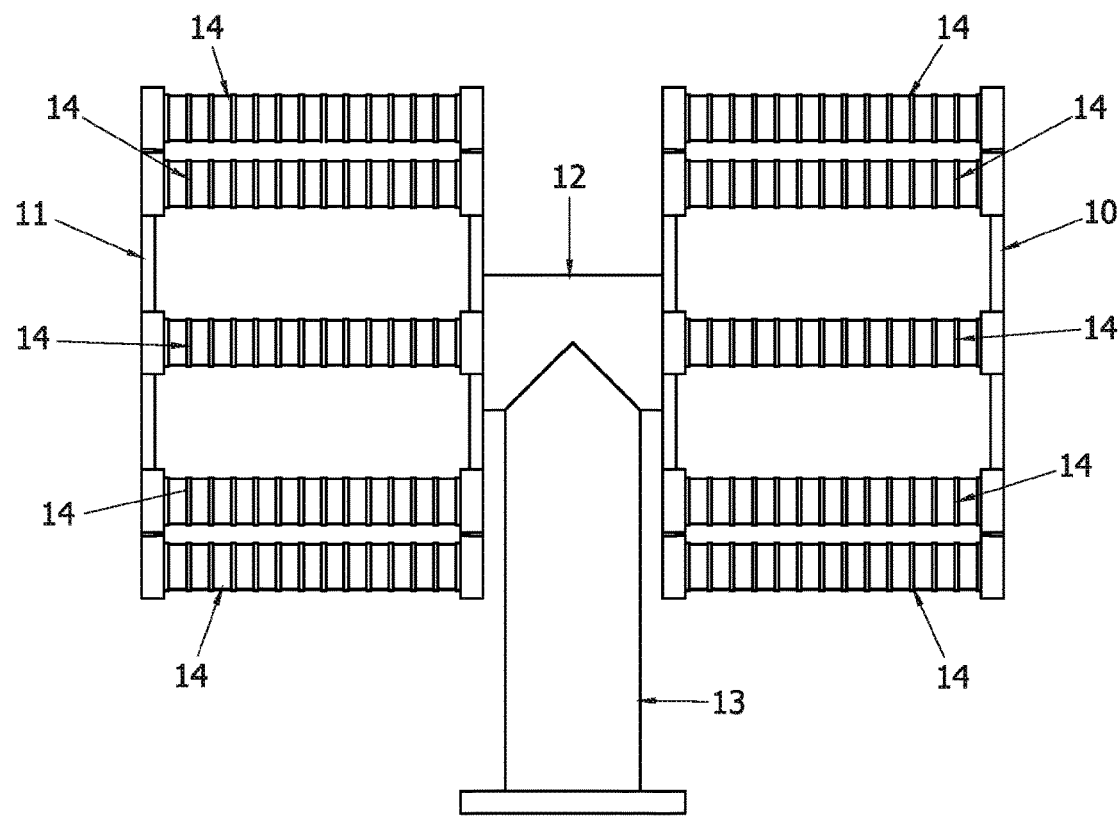
FIG. 6 is an entry side view of rotating former frames of the machine of FIG. 1.
Figure 7:
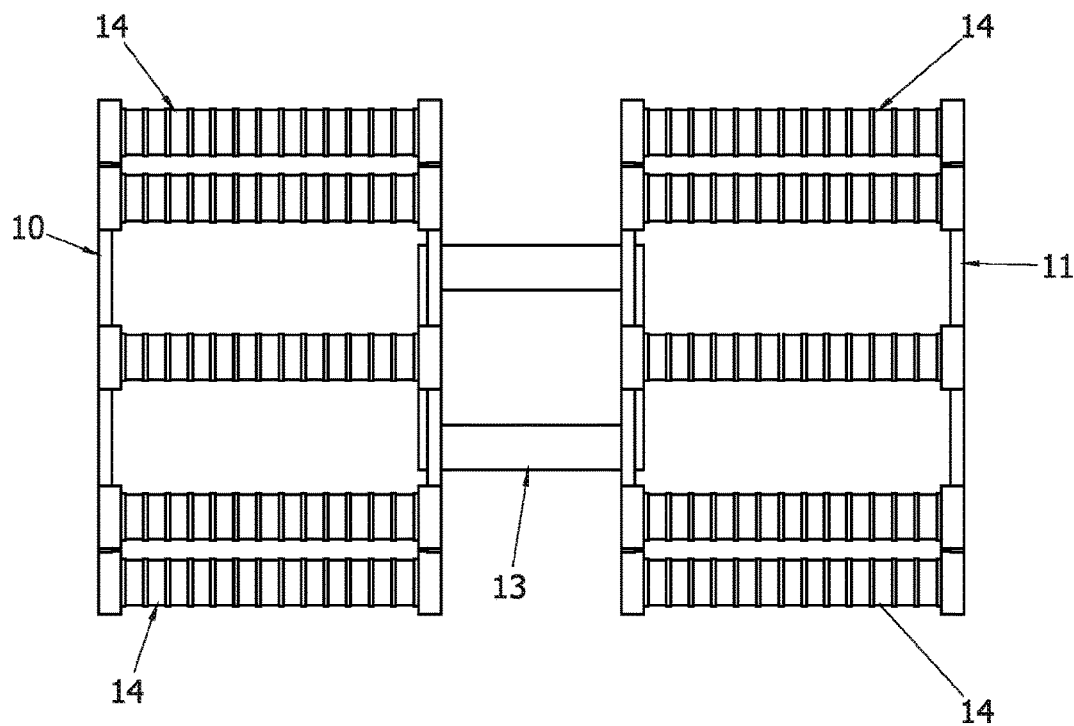
FIG. 7 is a plan view of the former frames.
Figure 8:
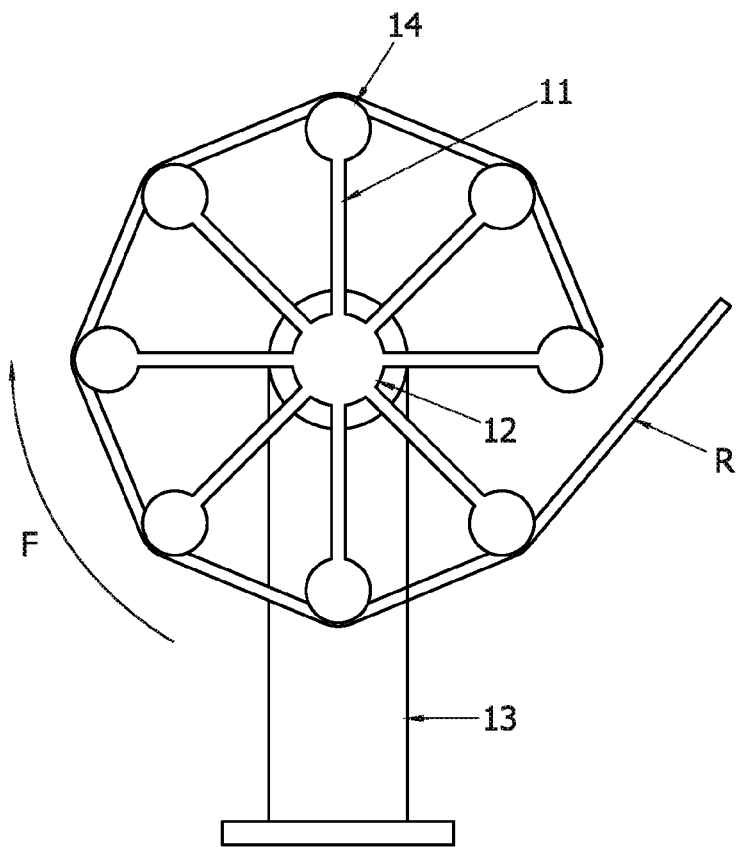
FIG. 8 is a side view of the former frames.

FIGS. 6 to 8 show the rotating multi-sided former frames 10 and 11 of the machine of FIG. 1. In the embodiment shown the former frames are carried on an axle/axis 12 through the top of pedestal 13 as shown, and rotate as indicated by arrows F (see FIGS. 1 and 8). In the embodiment shown the frames 10/11 are eight sided, to produce eight-sided rebar components as shown in FIG. 9.

The frames 10/11 at each of eight corners comprise a slotted former 14 (all marked in FIG. 6) around which the multiple wet rovings after impregnation and warp winding, are wound. In FIGS. 1 and 8 rovings on one frame 11 are indicated at R. The rovings are held on a frame while cured. Motor drive to each frame is individually controlled. While one frame is rotating—frame 11 at the point shown in the figures, receiving the two wet rovings from the two resin wetting stages, which are wound as two continuous adjacent spirals onto the one frame, the other frame rotating—frame 10 at the point shown in the figures, is stationary while cured by heat application onto the rovings previously wound onto that frame, and then while the cured (solid) multisided product is removed from that frame.

The two cured roving turns on that frame 10 (multiple turns for example 6 turns) may be cut into individual (for example 10) multisided products which are then individually removed from the frame 10, or in an alternative embodiment the whole frame may be removed and replaced with another empty frame, and the roving turns cut from that frame while off the machine, into individual products.

While one of the frames on one side of the machine is driven to rotate, and take up wet roving the cured roving on the other side of the machine is being removed. The speed of rotation of the moving frame is co-ordinated with the speed of movement of the roving bundles through the machine.

In the embodiment described above the two resin wetting stages and spiral warp winding stages feed one of the two former frames while the other former frame is stationary during curing and removal but in a higher volume production embodiment three or four or more resin wetting and spiral warp winding stages may feed three or four or more former frames.

The foregoing description of the invention includes preferred forms thereof. Modifications may be made thereto without departing from the scope of the invention as defined in the accompanying claims.

The invention claimed is:

1. A method of producing bent multi-sided pultruded fiber reinforced plastic (FRP) rebar, the method comprising:
   (a) drawing multiple bundles of first fiber rovings through at a first resin wetting stage to resin impregnate the first fiber rovings;
   (b) drawing multiple bundles of second fiber rovings through a second resin wetting stage to resin impregnate the second fiber rovings;
   (c) spiral winding first warps around the resin impregnated first fiber rovings;
   (d) spiral winding second warps around the resin impregnated second fiber rovings;
   (e) continuously winding the resin impregnated first fiber rovings onto a first portion of a first rotating multi-sided former frame;
   (f) continuously winding the resin impregnated second fiber rovings onto a second portion of the first rotating multi-sided former frame; and
   (g) simultaneously curing the resin impregnated first fiber rovings on the first portion of the first rotating multisided former frame to form a first bent multi-sided pultruded FRP product and the resin impregnated second fiber rovings on the second portion of the first rotating multi-sided former frame to form a second bent multi-sided pultruded FRP product.

2. The method of claim 1, wherein steps (a) and (b) occur simultaneously.

3. The method of claim 1, further comprising (h) cutting the first bent multi-sided pultruded FRP product on the first portion of the first rotating multi-sided former frame into a plurality of individual bent multi-sided pultruded FRP products; and (i) cutting the second bent multi-sided pultruded FRP product on the second portion of the first rotating multi-sided former frame into a plurality of individual bent multi-sided pultruded FRP products.

4. The method of claim 1, further comprising (j) curing one or more resin impregnated fiber rovings on a second rotating multi-sided former frame to form corresponding bent multi-sided pultruded FRP products, simultaneously while steps (e) and (f) are occuring.

5. The method of claim 4, further comprising (k) removing the one or more bent multi-sided pultruded FRP products from the second rotating multi-sided former frame, simultaneously while steps (e) and (f) are occurring.

6. The method of claim 4, wherein the first rotating multi-sided former frame and the second rotating multi-sided former frame rotate about the same axis.

7. The method of claim 4, wherein the first rotating multi-sided former frame and the second rotating multi-sided former frame are supported by the same base.

8. The method of claim 1, wherein step (a) comprises pressure impregnating resin into the first fiber rovings at the resin wetting stages; and wherein step (b) comprises pressure impregnating resin into the second fiber rovings.

9. The method of claim 1, wherein the first rotating multi-sided former frame has at least four sides.

10. An apparatus for producing bent multi-sided pultruded fiber reinforced plastic (FRP) rebar, the apparatus comprising:

a first resin wetting stage;
a second resin wetting stage;
a first spiral winding stage;
a second spiral winding stage;
a first rotating multi-sided former frame; and
a second rotating multi-sided former frame;
wherein the first and second resin wetting stages simultaneously resin impregnate a plurality of bundles of fiber rovings drawn through the respective resin wetting stages;
wherein the first and second spiral winding stages simultaneously wind warps around the respective bundles of impregnated fiber rovings;
wherein one of the first and second rotating multi-sided former frames simultaneously receives the bundles of impregnated fiber rovings from both the first and second spiral winding stages; and
wherein the first and second multi-sided former frames are operable to rotate independently of one another.

11. The apparatus of claim 10, wherein one of the first rotating multi-sided former frame and the second rotating multi-sided former frame is stationary while the other of the first rotating multi-sided former frame and the second rotating multi-sided former frame rotates.

12. The apparatus of claim 10, wherein the first rotating multi-sided former frame and the second rotating multi-sided former frame each has at least four sides.

13. The apparatus of claim 10, wherein the first and second resin wetting stages are operable to simultaneously pressure resin impregnate a plurality of bundles of fiber rovings drawn through the respective resin wetting stages.

14. The apparatus of claim 10, wherein the first rotating multi-sided former frame and the second rotating multi-sided former frame are on opposite sides of a base that supports the first and second multi-sided former frames.

15. The apparatus of claim 10, wherein the first rotating multi-sided former frame and the second rotating multi-sided former frame rotate about the same axis.

\* \* \* \* \*